US011373048B2

(12) United States Patent
Liu et al.

(10) Patent No.: US 11,373,048 B2
(45) Date of Patent: Jun. 28, 2022

(54) TRANSLATION OF MULTI-FORMAT EMBEDDED FILES

(71) Applicant: International Business Machines Corporation, Armonk, NY (US)

(72) Inventors: Su Liu, Austin, TX (US); Yang Liang, BeiJing (CN); Denise Marie Genty, Austin, TX (US); Fan Yang, Beijing (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 267 days.

(21) Appl. No.: 16/567,820

(22) Filed: Sep. 11, 2019

(65) Prior Publication Data
US 2021/0073341 A1    Mar. 11, 2021

(51) Int. Cl.
*G06F 40/58*     (2020.01)
*G06F 16/9535*   (2019.01)
(Continued)

(52) U.S. Cl.
CPC .......... *G06F 40/58* (2020.01); *G06F 16/9535* (2019.01); *G06F 40/55* (2020.01); *G06V 30/414* (2022.01)

(58) Field of Classification Search
CPC .... G06F 40/263; G06F 40/58; G06F 16/9535; G06F 40/143; G06F 40/205; G06F 40/40; G06F 40/55; G06F 40/47; G06K 9/0046
See application file for complete search history.

(56) References Cited

U.S. PATENT DOCUMENTS

| 5,523,946 A | * | 6/1996 | Kaplan | G06F 40/40 704/2 |
| 5,715,466 A | * | 2/1998 | Flanagan | G06F 40/58 704/5 |

(Continued)

FOREIGN PATENT DOCUMENTS

| CN | 1950820 A | 4/2007 |
| CN | 101137983 A | 3/2008 |

(Continued)

OTHER PUBLICATIONS

Kang et al.; "Detection and Recognition of Text Embedded in Online Images Via Neural Context Models", AAAI-17 31st AAAI Conference on, pp. 4103-4110, Feb. 4-9, 2017.

(Continued)

*Primary Examiner* — Wilson W Tsui
(74) *Attorney, Agent, or Firm* — Garg Law Firm, PLLC; Rakesh Garg; Nathan Rau

(57) ABSTRACT

In an embodiment, a method includes receiving, by a server, a request from a user for translation of a multi-format embedded file (MFEF) document, where the MFEF document includes a plurality of embedded elements. Responsive to the request for the MFEF document, the server automatically identifies element types of the embedded elements, where the embedded elements include a first element type and a second element type. The server also identifies foreign-language embedded elements from among the plurality of embedded elements, where the foreign-language embedded elements are embedded elements that are in a language other than a preferred language of the user. The server selects translators to translate the foreign-language embedded elements, including selecting a first translator for translating the first element type of foreign-language embedded (Continued)

elements and a second translator for translating the second element type of foreign-language embedded elements.

20 Claims, 9 Drawing Sheets

(51) Int. Cl.
*G06F 40/55* (2020.01)
*G06V 30/414* (2022.01)

(56) References Cited

U.S. PATENT DOCUMENTS

| | | | |
|---|---|---|---|
| 5,751,957 A * | 5/1998 | Hiroya | G06F 9/454 |
| | | | 709/203 |
| 5,903,859 A * | 5/1999 | Stone | G06F 40/55 |
| | | | 704/8 |
| 8,031,943 B2 | 10/2011 | Chen et al. | |
| 8,380,487 B2 | 2/2013 | Bastide et al. | |
| 9,098,488 B2 | 8/2015 | Hamid et al. | |
| 9,275,046 B2 | 3/2016 | Rogowski et al. | |
| 9,639,526 B2 | 5/2017 | Freiberg et al. | |
| 9,977,781 B2 * | 5/2018 | Swerdlow | G06F 3/04842 |
| 10,216,730 B2 | 2/2019 | Du et al. | |
| 2002/0078092 A1 * | 6/2002 | Kim | G06F 40/154 |
| | | | 715/234 |
| 2005/0149315 A1 * | 7/2005 | Flanagan | G06F 40/131 |
| | | | 704/2 |
| 2006/0174196 A1 | 8/2006 | Zhang et al. | |
| 2008/0233980 A1 * | 9/2008 | Englund | G06K 9/78 |
| | | | 455/466 |
| 2008/0243473 A1 * | 10/2008 | Boyd | G06F 40/58 |
| | | | 704/2 |
| 2009/0030671 A1 | 1/2009 | Kwon et al. | |
| 2010/0286977 A1 | 11/2010 | Chin et al. | |
| 2010/0324887 A1 | 12/2010 | Dong et al. | |
| 2012/0046933 A1 * | 2/2012 | Frei | G10L 15/26 |
| | | | 704/2 |
| 2013/0114849 A1 * | 5/2013 | Pengelly | G06K 9/00979 |
| | | | 382/103 |
| 2013/0132066 A1 | 5/2013 | Eldawy | |
| 2014/0081620 A1 | 3/2014 | Solntseva | |
| 2014/0288918 A1 * | 9/2014 | Orsini | G06Q 30/0201 |
| | | | 704/2 |
| 2014/0297256 A1 * | 10/2014 | Rogowski | G06K 9/00463 |
| | | | 704/2 |
| 2016/0019205 A1 * | 1/2016 | Kidwai | G06F 40/47 |
| | | | 704/7 |
| 2016/0275057 A1 | 9/2016 | Dendi et al. | |
| 2017/0124069 A1 | 5/2017 | Bondarchuk et al. | |
| 2018/0095950 A1 | 4/2018 | Phadke | |
| 2018/0157648 A1 | 6/2018 | He et al. | |
| 2019/0019105 A1 | 1/2019 | Schatz et al. | |

FOREIGN PATENT DOCUMENTS

| | | |
|---|---|---|
| CN | 102023971 A | 4/2011 |
| WO | 2012115507 A1 | 8/2012 |

OTHER PUBLICATIONS

Hewitt et al.; "Learning Translations Via Images With a Massively Multilingual Image Dataset", ACL 56th Annual Conference on, vol. 1, pp. 2566-2576, Jul. 15-20, 2018.
Wang et al.; "Mobile Visual text Translator", Stanford University, Department of Electrical Engineering, pp. 1-5, Published 2016.
Gao et al.; "An Adaptive Algorithm For Text Detection From Natural Scenes", CVPR IEEE Computer Society Conference on, vol. 2, pp. 1-6, Dec. 8-14, 2001.
International Searching Authority, PCT/IB2020/057626, dated Nov. 30, 2020.

* cited by examiner

*FIGURE 6*

| REQUEST ID | SOURCE DOCUMENT NAME | SOURCE DOCUMENT PATH | SOURCE DOCUMENT LANGUAGE | LIST OF ARRAY OF EMBEDDED ELEMENTS AND FORMATS | LANGUAGES OF EMBEDDED ELEMENT | TRANSLATION TOOLS OR SERVICES | THE USER PREFERRED TARGET LANGUAGE |
|---|---|---|---|---|---|---|---|
| RQ0005 602 | "main_pa ge.html" 604 | "https:// 123.com/ home/ main_pag e.html" 606 | "EN" 608 | (MAIN123.MP3) (MAIN456.JPG) (MAIN789.MP4) (MAIN001.TEXT) (MAIN002.TEXT) 610 | (MAIN123.MP3,EN) (MAIN456.JPG,JA) (MAIN789.MP4,FR) (MAIN001.TEXT,EN) (MAIN002.TEXT,E5) 612 | TRANSLATOR-1 (MAIN123.MP3, EN->ZH) TRANSLATOR-2 (MAIN456.JPG, JA>ZH) TRANSLATOR-3 (MAIN789.MP4, FR->ZH) TRANSLATOR-4 (MAIN002.TEXT, ES->ZH) 614 | (MAIN123.MP3,ZH) (MAIN456.JPG,ZH) (MAIN789.MP4,ZH) (MAIN001.TEXT,ZH) (MAIN002.TEXT,ZH) 616 |

600

TRANSLATION OF MULTI-FORMAT EMBEDDED FILES

TECHNICAL FIELD

The present invention relates generally to machine translations. More particularly, the present invention relates to machine translations of multi-format embedded files (MFEFs).

BACKGROUND

Multi-format embedded files (MFEFs) are commonly used in many places around the world, particularly in industrialized areas where access to the Internet is readily available and regularly used. MFEFs are files that contain multiple media elements in different formats, for example text, images, audio, and video elements. Examples of MFEFs include Hypertext (HTML) files, as well as many other well-known file formats, such as those associated with desktop publishing, presentations, word processing software. The use of media elements in MFEFs continues to grow as ongoing Internet and networking technology improvements make it faster and easier to share larger media-rich files.

SUMMARY

The illustrative embodiments provide a computer implemented method, computer system, and computer program product for translating embedded elements of a multi-format embedded file (MFEF) document. In an embodiment, the method includes receiving, by a server, a request from a user for translation of a multi-format embedded file (MFEF) document, where the MFEF document includes a plurality of embedded elements. Responsive to the request for the MFEF document, the server automatically: identifies element types of the embedded elements, where the embedded elements include a first element type and a second element type; identifies foreign-language embedded elements from among the plurality of embedded elements, the foreign-language embedded elements being embedded elements that are in a language other than a preferred language of the user; and selects proper translators to translate the foreign-language embedded elements, where a first translator is selected for translating the first element type of foreign-language embedded elements and a second translator is selected for translating the second element type of foreign-language embedded elements. Other embodiments of this aspect include corresponding computer systems, apparatus, and computer programs recorded on one or more computer storage devices, each configured to perform the actions of the method.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

FIG. 6 depicts a block diagram of an embodiment of an MFEF data structure in accordance with an illustrative embodiment.

DETAILED DESCRIPTION

Figure 1:
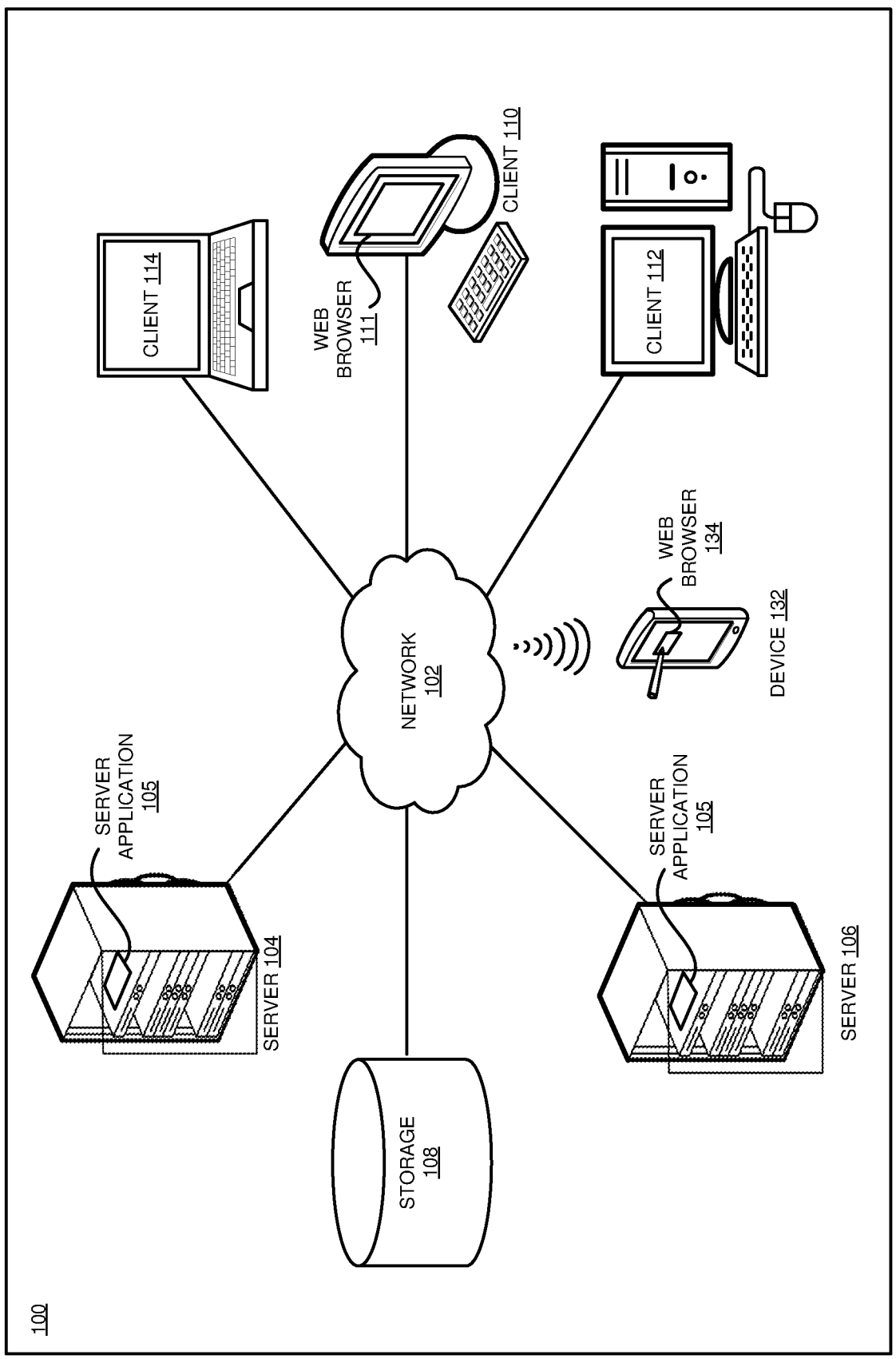
FIG. 1 depicts a block diagram of a network of data processing systems in which illustrative embodiments may be implemented.

Certain embodiments are described with respect to websites only as examples and not to imply any limitation on the illustrative embodiments. An embodiment described with respect to a website is similarly usable with respect to any document having embedded elements within the scope of the illustrative embodiments. Any description or example described using an MFEF document in connection with a web browser is similarly applicable to MFEF documents accessed without the use of a web browser.

Implementation of media elements in MFEFs has become increasingly prevalent as online advertisers compete for users' attention and broadband Internet connections continue to expand. Internet advertising comes in many forms. Traditional forms of Internet advertising are not unlike conventional advertising with graphical images except that the graphical images may be hosted on Web pages on an advertiser's website. With such Web page advertising, the retailer has the opportunity to capture the attention of the viewer, and if successful, a sale will be made. However, while Internet advertising has the potential to reach a worldwide audience, media elements such as audio, video, and images in advertisements generally only communicate effectively to users who speak the language used in the advertisement. Online translation services can translate plain text elements of a web site, but do not translate written or spoken words in images, video, or audio elements.

The illustrative embodiments used to describe the invention generally address and solve the above-described problem of a lack of translation for all foreign-language elements of an MFEF. The term "foreign language" and variations thereof, as used herein, generally refers to any language other than one or more preferred language(s) of the user. The illustrative embodiments recognize that the language of embedded elements are largely dependent on the creators and contributors to the MFEF document, and therefore are potentially decided by users anywhere around the world with write-access to the MFEF document. Online services for limited translation of websites presently exist, but are limited to translating the pure-text portions of the website and do not translate other types of embedded elements, such as images, audio, and video types of elements.

The illustrative embodiments recognize that by parsing an MFEF document to identify and evaluate all of the embedded elements or simply by evaluating all parts of an MFEF document, a language barrier can be identified in elements of an MFEF document. Once a language barrier in an MFEF document is identified, the language barrier should be corrected.

For example, assume that a single element of an MFEF document is the only element that is in a language that is foreign to the user, and the remaining multiple elements are in the user's preferred language. For example, user comments submitted in a foreign language on an interactive website and an advertisement in a foreign language on a commercial website are examples of such situations. The illustrative embodiments recognize that in some such cases, remedying the problem is as simple as translating only the single element without affecting the remainder of the MFEF document.

For example, a user, such as a contributor or advertiser on a website may not be familiar with the languages of other users worldwide who will be visiting the website. When the user attempts to reach a broad audience with their contribution or advertisement, audience is limited to those who can speak or read the language used for the contribution or advertisement. Many other users who are not proficient in the language used for the contribution or advertisement may not have a way of translating the element or may not take the time to attempt to find a way to translate the element. As a result, the language barrier limits the user's ability to reach some of the visitors to the website.

As a further consequence, in the case of an online advertisement, the language barrier potentially has a negative impact on the user's business and advertising budget. On the one hand, the advertiser may miss sales to visitors who cannot comprehend the advertisement due to a language barrier. Also, the user may still be expected to pay for each instance in which the advertisement is displayed, even if it is not comprehended by the all visitors to which it is presented. Thus, this situation compounds the negative impact on the advertiser's business due to the potential for a lost sale and the expense of advertising to visitors who are not proficient in the language used in the advertisement.

The illustrative embodiments further recognize that remedies to the language barrier problem may not be effective where they require much effort on the part of the user. For example, various translation services may be created that require the user to proactively separate certain elements of an MFEF document and seek out such translation services on an element by element basis, significantly interrupting the user's ability to browse through various websites. For example, a user performing online research may prefer to continue searching for information presented in their own preferred language than take the time to find ways to translate elements that are in other languages. Some users may view this as inefficient compared to continuing to search for information in their native language.

The illustrative embodiments further recognize that a remedy for the language barrier problem may not be effective where the framework or layout of the original MFEF document is not retained such that the translated elements are provided in the same layout as the original elements. For example, embedded elements may lose some meaning outside the context of the particular layout of the MFEF document, such as comments posted in a particular order or audio elements that provide content associated with particular images. In such situations, if the user receives translations outside the context of the layout of the original MFEF, it can be very difficult and time consuming to determine how the translated elements fit in the original image and understand the context that was lost during the translation.

Therefore, the illustrative embodiments recognize that an MFEF translation system would be useful in identifying foreign-language elements in MFEF documents, automatically translating the foreign-language elements, and replacing the foreign-language elements with the translated elements by embedding the translated elements in the MFEF document so as to maintain the layout of the original MFEF document. These and other features of such a system would give users, content providers, and advertisers better ability to communicate effectively with a global audience.

The illustrative embodiments used to describe the invention generally address and solve the above-described problems and other problems related to solving language barriers or communication problems in MFEF documents. The illustrative embodiments provide a method, system, and computer program product for translation of MFEF documents.

An embodiment identifies, or receives information about an MFEF document requested by a user where the MFEF document has one or more foreign-language embedded elements. One embodiment also receives a location of the MFEF document, such as a file location or a URL. Another embodiment receives a copy of the MFEF document instead of, or in addition to, the location of the original MFEF document.

An embodiment identifies one or more preferred languages of the user requesting the MFEF document. Some embodiments retrieve the user's preferred language from a database that stores user information, where the user provided a list of one or more preferred languages. Some embodiments infer the user's preferred language based on available information about the user, for example header information indicating a preferred language of the user as set in the user's web browser or historical information provided by the user that includes information regarding the language(s) of documents previously read or retrieved by the user. Some embodiments prompt the user to provide a preferred language. In some such embodiments, the prompt requesting the preferred language includes an image or a plurality of images from which the user can select, where the plurality of images depict images readily associated with respective languages, for example flags or geographical locations.

Embodiments of the MFEF translation system streamline the process of providing translations of foreign-language elements to the user by providing the MFEF translation system as a service that is readily available for use by the user or that automatically detects and translates foreign language elements in requested documents. For example, in some embodiments, when the client device issues a request to a remote web server for an MFEF document, the remote web server receives the request and utilizes the MFEF translation system to translate any embedded elements in the requested MFEF document that are in a language other than the user's preferred language.

In other embodiments, when the client receives an MFEF document that includes one or more foreign language elements, the client utilizes the MFEF translation system to translate them. For example, in some embodiments, the MFEF translation system is configured to include an MFEF web browser extension for providing translation of elements of requested MFEF documents. In some such embodiments, an MFEF web browser extension can be configured for incorporation within any suitable web browser tool or application as a plug-in, add-on, or extension. In some embodiments, an MFEF translation web browser extension is incorporated within a web browser and is configured to request translations of foreign-language embedded elements of the MFEF document, receive the requested translated embedded elements, and incorporate the translated embedded elements into the MFEF document as replacements for the foreign-language embedded elements.

In further embodiments, the client device is configured to use a proxy server that relays HTTP requests and responses from and to the client device. In some such embodiments, when the proxy server detects that an MFEF document being sent to the client includes foreign language elements, the proxy server utilizes the MFEF system to translate any embedded elements in the requested MFEF document that are in a language other than the user's preferred language and relays the translated elements to the client.

In some embodiments, the MFEF server includes an MFEF API that receives API requests for translation of an MFEF documents. In some embodiments, the API requests comprise the MFEF document, the MFEF document name, a URL or file location of the MFEF document, and a preferred language of the user. In some embodiments, the API request can include a plurality of preferred languages of the user. In some such embodiments, the plurality of preferred languages can be in order of preference of preferred languages.

In some embodiments, the MFEF server includes an embedded element recognizer that parses the information in the translation request, including parsing the MFEF document, and recognizes the number and types of embedded elements in the MFEF document. In some embodiments, the MFEF server also includes an embedded element language detector that utilizes known technology to detect the language of each of the embedded elements detected by the embedded element recognizer. In some embodiments, the embedded element language detector compares the detected languages of the embedded elements to the preferred language of the user to determine which embedded elements need to be translated.

In some embodiments, the MFEF server includes an MFEF translator that operates in response to the embedded element language detector detecting the languages of the embedded elements to acquire computer-based machine-generated translations of each of the embedded elements. In some embodiments, the MFEF translator utilizes a variety of third-party translation services for acquiring computer-based machine-generated translations translating one or more of the embedded elements. In some embodiments, the MFEF translator includes one or more modules that utilize known technology for generating machine-generated translations one or more of the embedded elements. In some embodiments, the MFEF translator utilizes human translators for translating one or more of the embedded elements.

In some embodiments, the MFEF translator selects from among two or more translators based at least in part on a level of service associated with the requesting user. For example, in some embodiments, the MFEF translator selects a more accurate and/or more expensive translator for a user associated with a first tier of service, and selects a less accurate and/or less expensive translator for a user associated with a second tier of service.

In some embodiments, the MFEF server includes an MFEF generator that receives the translated embedded elements and generates a new MFEF document that includes the translated embedded elements. In some embodiments, the MFEF generator returns the translated embedded elements to the MFEF client.

In some embodiments, the MFEF client includes a display wizard that receives the translated MFEF document and saves the new MFEF document as target document in a temporal directory. The display wizard returns a pointer to the user's web browser that directs the web browser to display the target document with the translated embedded elements. In some embodiments, the display wizard verifies the structure of the new MFEF document matches that of the original MFEF document and that the translated embedded elements replace the corresponding foreign-language embedded elements in the same respective locations as the foreign-language embedded elements.

In some embodiments, the display wizard uses prefetching technology for embedded elements that are still being translated when the MFEF generator sends the new MFEF document to the display wizard. In some such embodiments, the MFEF generator includes a link for embedded elements that are still being translated, and the display wizard inserts a temporary message to alert the user to the pending status of such translations, and remove the temporary message once the translations are complete and the translated embedded elements have been received and embedded in the new MFEF document.

For the sake of clarity of the description, and without implying any limitation thereto, the illustrative embodiments are described using some example configurations. From this disclosure, those of ordinary skill in the art will be able to conceive many alterations, adaptations, and modifications of a described configuration for achieving a described purpose, and the same are contemplated within the scope of the illustrative embodiments.

Furthermore, simplified diagrams of the data processing environments are used in the figures and the illustrative embodiments. In an actual computing environment, additional structures or component that are not shown or described herein, or structures or components different from those shown but for a similar function as described herein may be present without departing the scope of the illustrative embodiments.

Furthermore, the illustrative embodiments are described with respect to specific actual or hypothetical components only as examples. The steps described by the various illustrative embodiments can be adapted for providing explanations for decisions made by a machine-learning classifier model, for example Any specific manifestations of these and other similar artifacts are not intended to be limiting to the invention. Any suitable manifestation of these and other similar artifacts can be selected within the scope of the illustrative embodiments.

The examples in this disclosure are used only for the clarity of the description and are not limiting to the illustrative embodiments. Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, contrastive explanations, computer readable storage medium, high-level features, historical data, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Figure 2:
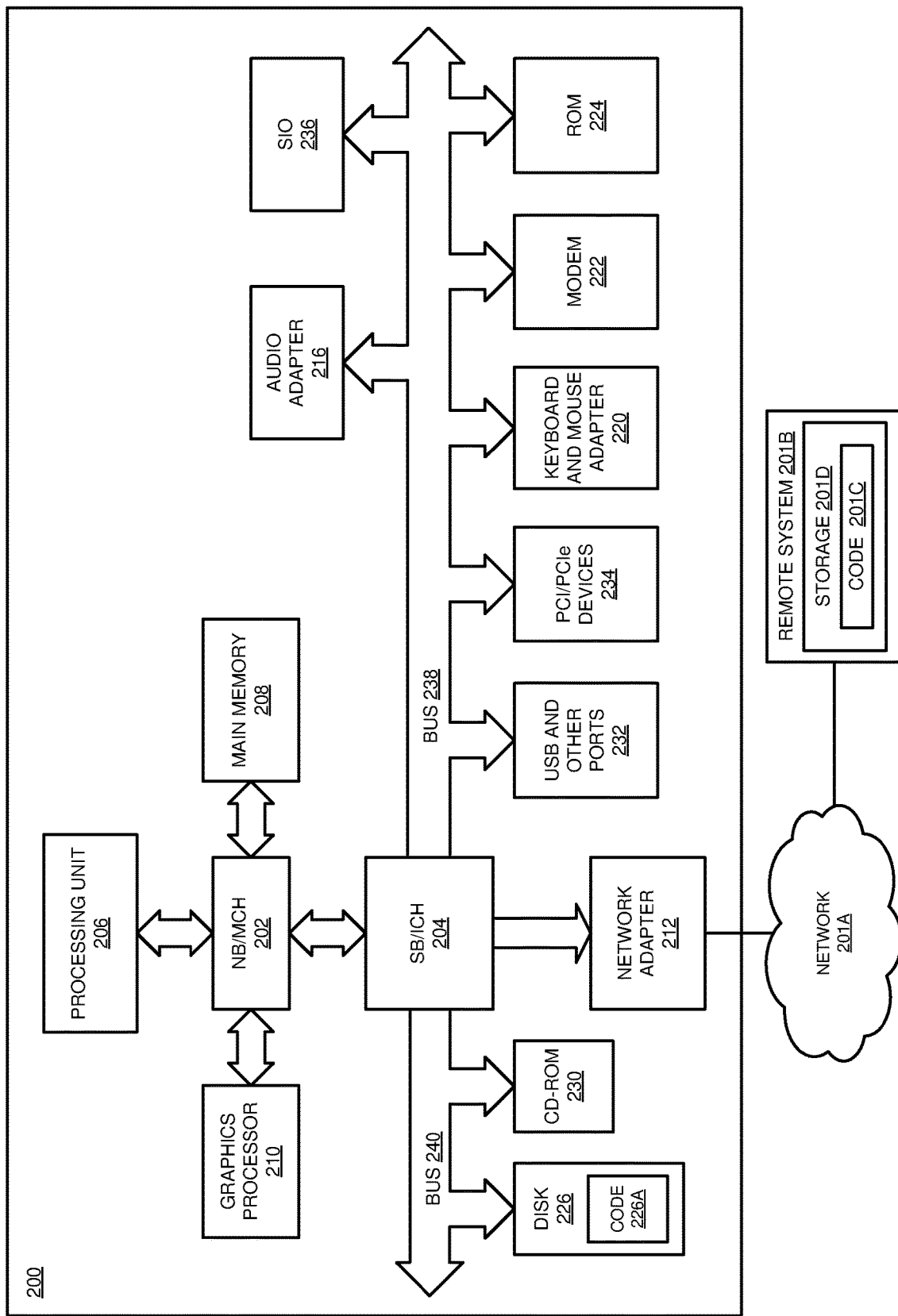
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a block diagram of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables.

Clients or servers are only example roles of certain data processing systems connected to network 102 and are not intended to exclude other configurations or roles for these data processing systems. Server 104 and server 106 couple to network 102 along with storage unit 108. Software applications may execute on any computer in data processing environment 100. Clients 110, 112, and 114 are also coupled to network 102. A data processing system, such as server 104 or 106, or client 110, 112, or 114 may contain data and may have software applications or software tools executing thereon.

Only as an example, and without implying any limitation to such architecture, FIG. 1 depicts certain components that are usable in an example implementation of an embodiment. For example, servers 104 and 106, and clients 110, 112, 114, are depicted as servers and clients only as example and not to imply a limitation to a client-server architecture. As another example, an embodiment can be distributed across several data processing systems and a data network as shown, whereas another embodiment can be implemented on a single data processing system within the scope of the illustrative embodiments. Data processing systems 104, 106, 110, 112, and 114 also represent example nodes in a cluster, partitions, and other configurations suitable for implementing an embodiment.

Device 132 is an example of a device described herein. For example, device 132 can take the form of a smartphone, a tablet computer, a laptop computer, client 110 in a stationary or a portable form, a wearable computing device, or any other suitable device. Any software application described as executing in another data processing system in FIG. 1 can be configured to execute in device 132 in a similar manner. Any data or information stored or produced in another data processing system in FIG. 1 can be configured to be stored or produced in device 132 in a similar manner.

Server application 105 implements an embodiment described herein. Server application 105 implements a remotely usable function (remote) of an embodiment described herein. Web browser 111 implements a locally usable function (local) or a natively usable function (native) of an embodiment described herein. Web browser 134 implements a natively usable function (native) of an embodiment described herein. Server applications 105 on multiple servers 104 and 106 can be used in a combination.

Servers 104 and 106, storage unit 108, and clients 110, 112, and 114, and device 132 may couple to network 102 using wired connections, wireless communication protocols, or other suitable data connectivity. Clients 110, 112, and 114 may be, for example, personal computers or network computers.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a client data processing system and a server data processing system. Data processing environment 100 may also employ a service-oriented architecture where interoperable software components distributed across a network may be packaged together as coherent business applications. Data processing environment 100 may also take the form of a cloud, and employ a cloud computing model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service.

With reference to FIG. 2, this figure depicts a block diagram of a data processing system in which illustrative embodiments may be implemented. Data processing system 200 is an example of a conventional computer, such as data processing system 104, server 106, or clients 110, 112, and 114 in FIG. 1, or another type of device in which computer usable program code or instructions implementing the processes may be located for the illustrative embodiments.

Data processing system 200 is also representative of a conventional data processing system or a configuration therein, such as conventional data processing system 132 in FIG. 1 in which computer usable program code or instructions implementing the processes of the illustrative embodiments may be located. Data processing system 200 is described as a computer only as an example, without being limited thereto. Implementations in the form of other devices, such as device 132 in FIG. 1, may modify data processing system 200, such as by adding a touch interface, and even eliminate certain depicted components from data processing system 200 without departing from the general description of the operations and functions of data processing system 200 described herein.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) or solid-state drive (SSD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE), serial advanced technology attachment (SATA) interface, or variants such as external-SATA (eSATA) and micro-SATA (mSATA). A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive or solid-state drive 226, CD-ROM 230, and other similarly usable devices are some examples of computer usable storage devices including a computer usable storage medium.

An operating system runs on processing unit 206. The operating system coordinates and provides control of various components within data processing system 200 in FIG. 2. The operating system may be a commercially available operating system for any type of computing platform, including but not limited to server systems, personal computers, and mobile devices. An object oriented or other type of programming system may operate in conjunction with the operating system and provide calls to the operating system from programs or applications executing on data processing system 200.

Instructions for the operating system, the object-oriented programming system, and applications or programs, such as application 105 in FIG. 1, are located on storage devices, such as in the form of code 226A on hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

Furthermore, in one case, code 226A may be downloaded over network 201A from remote system 201B, where similar code 201C is stored on a storage device 201D. in another case, code 226A may be downloaded over network 201A to remote system 201B, where downloaded code 201C is stored on a storage device 201D.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a mobile or wearable device.

Where a computer or data processing system is described as a virtual machine, a virtual device, or a virtual component, the virtual machine, virtual device, or the virtual component operates in the manner of data processing system 200 using virtualized manifestation of some or all components depicted in data processing system 200. For example, in a virtual machine, virtual device, or virtual component, processing unit 206 is manifested as a virtualized instance of all or some number of hardware processing units 206 available in a host data processing system, main memory 208 is manifested as a virtualized instance of all or some portion of main memory 208 that may be available in the host data processing system, and disk 226 is manifested as a virtualized instance of all or some portion of disk 226 that may be available in the host data processing system. The host data processing system in such cases is represented by data processing system 200.

Figure 3:
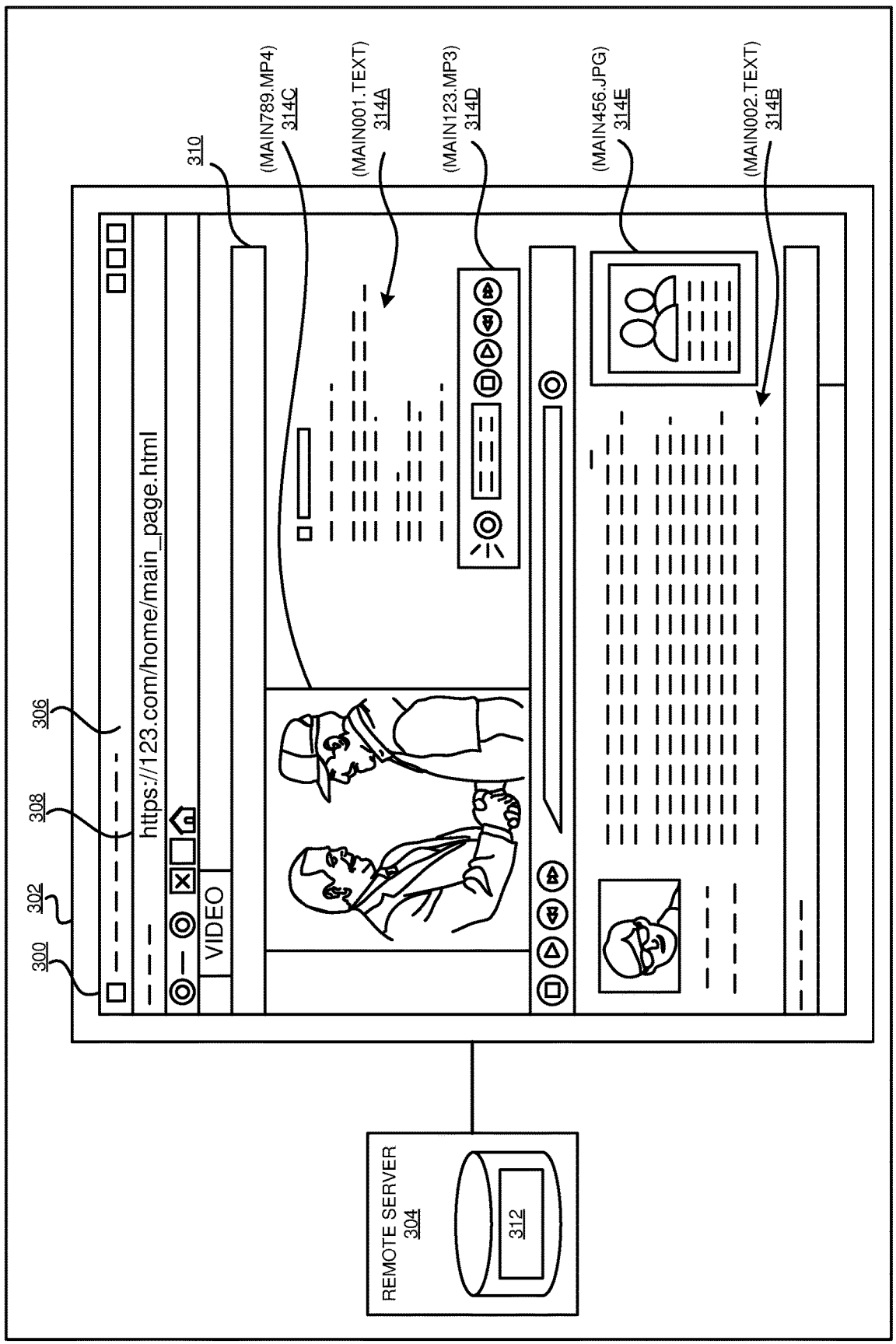
FIG. 3 depicts a screen generated by an MFEF having multiple media elements in different languages in accordance with an illustrative embodiment.

With reference to FIG. 3, this figure depicts a screen 300 displayed by a client 302 in accordance with an illustrative embodiment. The example embodiment includes a remote server 304 in communication with the client 302. In a particular embodiment, client 302 is an example of clients 110, 112, 114, and device 132 of FIG. 1 and remote server 304 is an example of a servers 104 and 106 in FIG. 1.

In some embodiments, the screen 300 includes a web browser 306 that has navigated to a Uniform Resource Locator (URL) 308 and rendered the displayed website 310 based on an MFEF document (main_page.html) 312 received from the remote server 304. In some embodiments, the MFEF document 312 includes a plurality of embedded elements 314A-314E, where embedded element 314A is a text element type (Main001.text) in English, embedded element 314B is a text element type (Main002.text) in Spanish, embedded element 314C is a video element type (Main789.mp4) in French, embedded element 314D is an audio element type (Main123.mp3) in English, and embedded element 314E is an image element type (Main456.jpg) having text in Japanese. In some embodiments, the MFEF document is any of many well-known file formats that allow for embedded elements, including those created using website design software, desktop publishing software, presentation software, and word processing software. The term "embedded element," as used herein, generally refers to media elements installed into, or linked to, a text document to form a compound document. Examples of embedded elements include, without limitation, a sound object and an image object inserted into a word publishing document or a video object, an image object, and a sound object.

In some embodiments, the screen 300 appears as shown in FIG. 3 both before and after main_page.html has been translated. For example, in some embodiments, the translation process completely replaces the foreign-language embedded elements with the translated embedded elements in the same respective locations of the replaced foreign-language embedded elements.

In some embodiments, when a user inputs a URL 308, the web browser 306 initiates a Hypertext Transfer Protocol (HTTP) request to the remote server 304 that has an Internet Protocol (IP) address associated with the input URL 308, and the remote server 304 responds by transmitting the main_page.html file 312 to the web browser 306. In some embodiments, the web browser 306 then renders the main_page.html file 312 as-is without any translation, but allowing the user to request translation of one or more of any foreign-language embedded elements. In some embodiments, the web browser 306 then renders the main_page.html file 312 with translated versions of any foreign-language embedded elements.

Figure 4A:
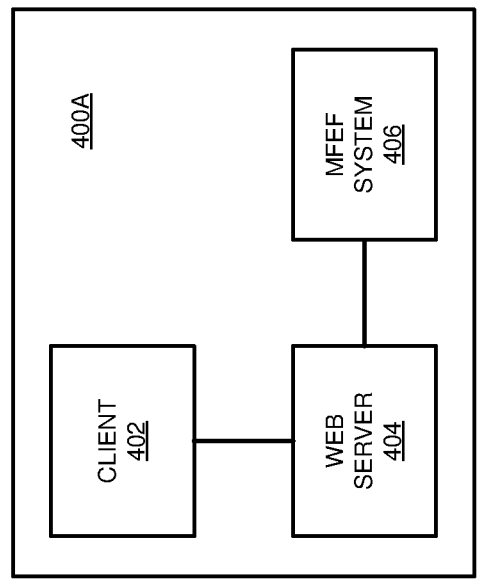
FIG. 4A depicts a block diagram of a network configurations in accordance with illustrative embodiments.
Figure 4B:
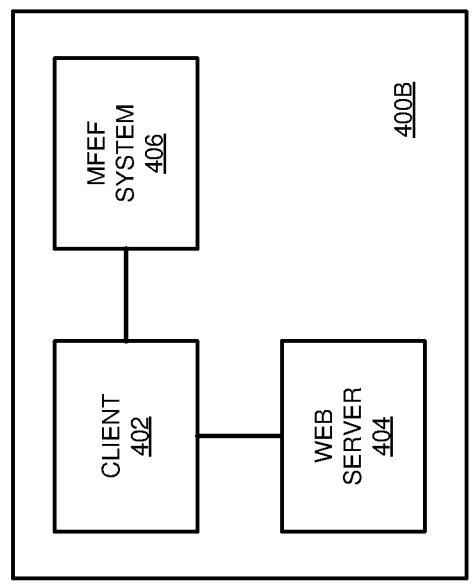
FIG. 4B depicts a block diagram of a network configurations in accordance with illustrative embodiments.
Figure 4C:
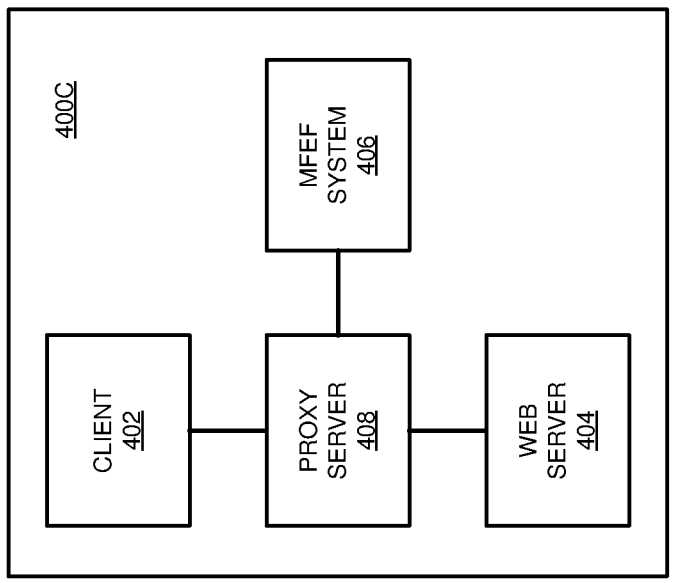
FIG. 4C depicts a block diagram of a network configurations in accordance with illustrative embodiments.

With reference to FIGS. 4A-4C, these figures depict block diagrams of respective examples of network configurations 400A-400C in accordance with illustrative embodiments. The example embodiments are non-limiting examples, and still further embodiments include alternative configurations. In some embodiments, the MFEF translation system 406 described herein is accessible by the user's client device 402, by a remote web server 404 that is hosting the MFEF document, or by a proxy server 408, if any. For example, in some embodiments, the MFEF system 406 includes an Application Programming Interface (API) that is accessible by the user's client device 402, by a remote web server 404 that is hosting the MFEF document, or by a proxy server 408, if any.

For example, with reference to FIG. 4A, in some embodiments, when the client device 402 issues a request to a remote web server 404 for an MFEF document, the remote web server 404 receives the request and utilizes the MFEF translation system 406 to translate any embedded elements in the requested MFEF document that are in a language other than the user's preferred language. For example, in some embodiments, the client device 402 issues an HTTP request that includes header information indicative of the user's preferred language, and the remote web server 404 uses the header information to determine whether to translate any of the embedded elements. Alternatively, in some embodiments, the remote web server 404 receives the user's preferred language from the user, for example through a registration process or issuing a prompt displayed by the client 402 requesting the user's preferred language. In some such embodiments, the prompt requesting the preferred language includes an image or a plurality of images from which the user can select, where the plurality of images depict images readily associated with respective languages, for example flags or geographical locations.

Some embodiments include an enhanced remote web server 404 that maintains a list of the users' possible preferred languages, and then proactively call the MFEF translation system 406 to MFEF service before the client 402 calls. Some embodiments include an enhanced web server 404 that translates all contents to the listed users' preferred languages and saves the translated documents in separated translated language directories accordingly. Some embodiments will redirect the client 402 to access the translated document In real time, the enhanced 404 will redirect the 402 to access the translated document for optimizing the performance (reduce translation time and cost).

As another example, with reference to FIG. 4B, in some embodiments, when the client 402 receives the MFEF document, client 402 utilizes the MFEF translation system 406 to translate any embedded elements that are in a language other than the user's preferred language. For example, in some embodiments, the MFEF translation system 406 is configured to include an MFEF web browser extension for providing translation of elements of requested MFEF documents. In some such embodiments, an MFEF web browser extension can be configured for incorporation within any suitable web browser tool or application as a plug-in, add-on, or extension. As used herein, the terms "plug-in", "add-on", or "extension", and the like refer to a software application or module program, or one or more computer instructions, which may or may not be in communication with other software applications or modules, that interacts with a host application to provide specified functionality, and which may include any file, image, graphic, icon, audio, video, or any other attachment. In some embodiments, an MFEF translation web browser extension is incorporated within a web browser and is configured to request translations of foreign-language embedded elements of an MFEF document, receive the requested translated embedded elements, and incorporate the translated embedded elements into the MFEF document as replacements for the foreign-language embedded elements.

As another example, with reference to FIG. 4C, in some embodiments, when a proxy server 408 receives an HTTP request from a client 402 for an MFEF document, the proxy server 408 relays the request to the appropriate web server 404 and receives the MFEF document in response. In some such embodiments, the utilizes the MFEF system 406 to translate any embedded elements in the requested MFEF document that are in a language other than the user's preferred language and relays the translated elements to the client 402. For example, in some embodiments, the client device 402 issues an HTTP request that includes header information indicative of the user's preferred language, and the proxy server 408 uses the header information to determine whether to translate any of the embedded elements. Alternatively, in some embodiments, the proxy server 408 receives the user's preferred language from the user, for example through a registration process or issuing a prompt displayed by the client 402 requesting the user's preferred language.

In some embodiments, the MFEF translation system 406 is enabled through a cloud-based Software as a Service (SaaS) based offering that provides the capability to use the MFEF translation system 406 with any network configuration, including any of the configurations 400A-400C. In some such embodiments, MFEF translation system 406 is accessible from various client, proxy server, or web server devices through an interface such as a web browser (e.g., web-based e-mail) or API. In some such embodiments, the MFEF translation system 406 is configured to receive an MFEF document or a link to an MFEF document for translation.

Figure 5:
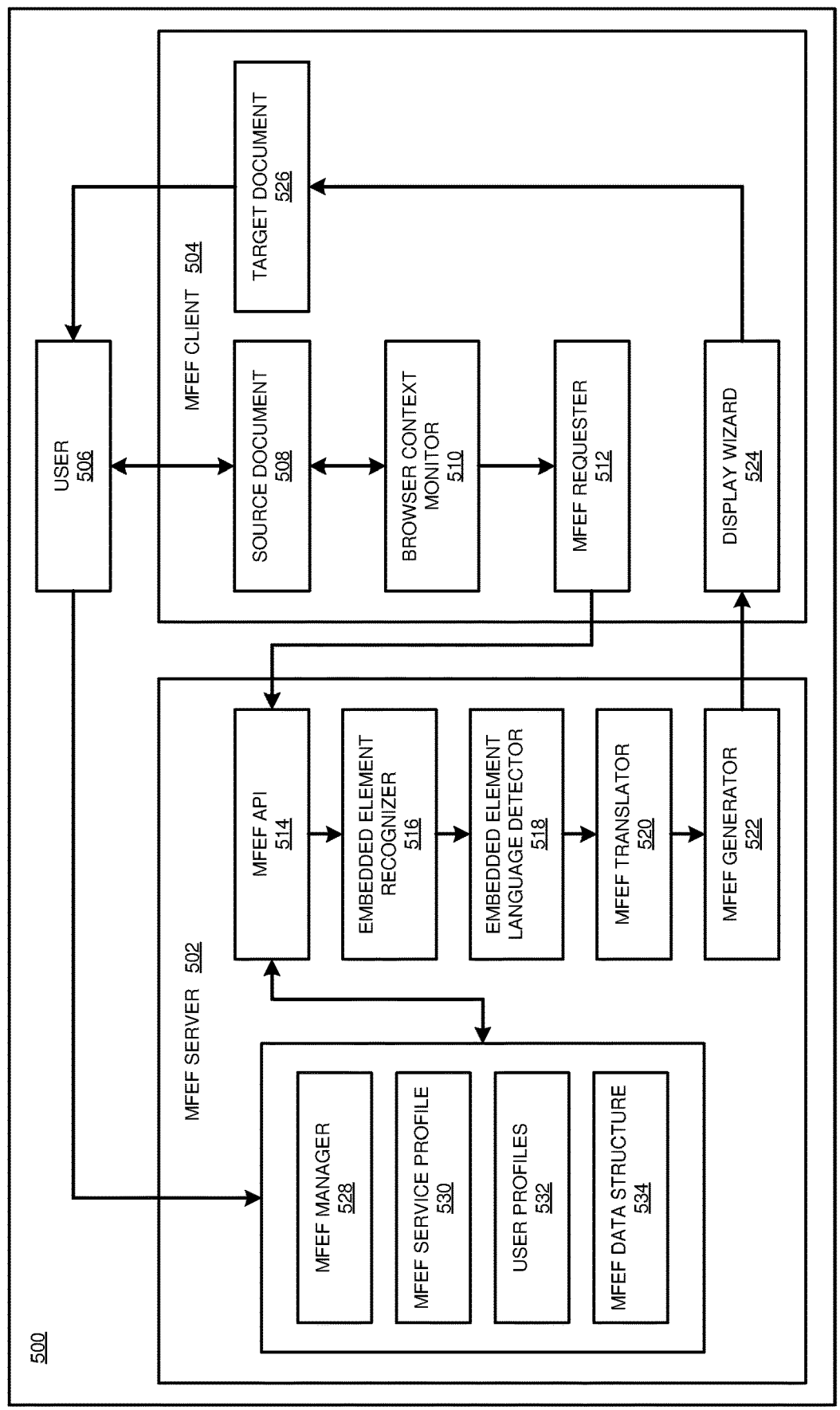
FIG. 5 depicts a block diagram of an exemplary MFEF translation system for translating MFEF documents in accordance with an illustrative embodiment.

With reference to FIG. 5, this figure depicts a block diagram of an exemplary MFEF translation system 500 for translating MFEF documents in accordance with an illustrative embodiment. In some embodiments, the MFEF translation system 500 includes an MFEF server 502 and an MFEF Client 504.

In some embodiments, when the user 506 requests an MFEF document, such as the MFEF document 312 shown in FIG. 3, if the MFEF document 312 includes embedded elements in languages other than the user's preferred language, the MFEF translation system 500 is able to translate the foreign-language embedded elements. In some embodiments, the user 506 uploads the MFEF document to the client side 504 of the MFEF translation system 500, where the MFEF document is stored as source document 508. In alternative embodiments, the user 506 provides a link, such as a URL, to the MFEF document, and the MFEF translation system 500 requests and receives the MFEF document using the link provided by the user 506 and stores the MFEF document as the source document 508.

In some embodiments, the MFEF client 504 includes a browser context monitor 510 for monitoring and analyzing the Internet browsing history or Internet activity associated with the user 506. For example, in some embodiments, the browser context monitor 510 has ongoing access to the user's browsing activities. In some embodiments, the user's personal computer and/or web browser logs the user's Internet browsing history and periodically provided to the browser context monitor 510, for example according to a scheduled task or according to the occurrence of some event, such as every time the user connects to the MFEF client 504. In some embodiments, the browser context monitor 510 monitors one or more browsing behaviors and user actions by User 506. In some such embodiments, the browser context monitor 510 parses this information to make predictions regarding languages spoken by the user 506. In some such embodiments, the browser context monitor 510 predicts language or languages spoken by User 506 and monitors source document 508 for documents that are not a language or language identified as being spoken by User 506.

In some embodiments, the browser context monitor 510 identifies a language understood by the user 506 based on the Internet browsing activities associated with the user 506. In some embodiments, the browser context monitor 510 collects, creates, and maintains a context for the user 506 that includes languages spoken by the user 506 and monitors incoming web pages for those that will require translations. In some embodiments, the browser context monitor 510 is a module for monitoring user's reading behavior, identifying user's action, and determining, based at least in part on the stored User behavior, whether the User will speak the language of the user's translation intention (such as: translate embedded image from English to Chinese). In some embodiments, the browser context monitor 510 determines that the User 506 has requested a translation of one or more embedded elements of an MFEF at source document 508.

In some embodiments, the MFEF client 504 includes an MFEF requester 512 for forming MFEF translation requests and transmitting the MFEF translation requests to the MFEF server 502. In some embodiments, the MFEF requester 512 automatically requests translations from the MFEF server 502 in response to the browser context monitor 510 identifying foreign-language embedded elements.

In some embodiments, the MFEF server 502 includes an MFEF API 514 that receives, from the MFEF requester 512, an API request for translation of an MFEF document, where the request is structured according to a format defined by the MFEF API 514. For example, in some embodiments, the API request comprises the MFEF document, the MFEF document name, a URL or file location of the MFEF document, and a preferred language of the user. In some embodiments, the API request can include a plurality of preferred languages of the user. In some such embodiments, the plurality of preferred languages can be in order of preference of preferred languages. In some embodiments, the MFEF API 514 assigns a request ID, which is a unique identifier that identifies the translation request from the MFEF requester 512. In some embodiments, the MFEF API 514 determines data formats, functionality, a choice and format of passed parameters, syntax, and other characteristics of each service request and response. In some embodiments, the MFEF API 514 conforms to common or open conventions, such as SOAP or REST, or follows a proprietary, vendor-specific, or application-exclusive format.

In some embodiments, the MFEF server 502 includes an embedded element recognizer 516 that parses the information in the translation request, including parsing the MFEF document, and recognizes the number and types of embedded elements in the MFEF document. For example, in some embodiments, the embedded element recognizer 516 parses the MFEF document 312 in FIG. 3 and recognizes embedded element 314A is a text element type (Main001.text), embedded element 314B is a text element type (Main002.text), embedded element 314C is a video element type (Main789.mp4), embedded element 314D is an audio element type (Main123.mp3), and embedded element 314E is an image element type (Main456.jpg).

In some embodiments, the MFEF server 502 includes an embedded element language detector 518 that utilizes known computer-based technology to detect the language of each of the embedded elements detected by the embedded element recognizer 516. For example, in some embodiments, the embedded element language detector 518 detects the languages of the embedded elements 314A-314E detected by the embedded element recognizer 516 detects that embedded element 314A is a text element type (Main001.text) in English, embedded element 314B is a text element type (Main002.text) in Spanish, embedded element 314C is a video element type (Main789.mp4) in French, embedded element 314D is an audio element type (Main123.mp3) in English, and embedded element 314E is an image element type (Main456.jpg) in Japanese. In some embodiments, embedded element language detector 518 will evaluate audio and video elements to determine whether there are captions or subtitles in addition to the audio that will also be translated. In some embodiments, the embedded element language detector 518 will compare the detected languages of the embedded elements to the preferred language of the user 506 to determine which embedded elements need to be translated to the user's preferred language. For example, if the user's preferred language is Chinese (or "ZH"), the embedded element language detector 518 will pass all of the embedded elements to the MFEF translator 520 for translation to Chinese (or "ZH"). As another example, if the user's preferred language is English, the embedded element language detector 518 will pass the embedded elements 314B (Spanish, or ES), 314C (French, or FR), and 314E (Japanese, or JA) to the MFEF translator 520 for translation to English, and the remaining two embedded elements 314A and 314D, which are already in the user's preferred language, can remain unchanged in the original MFEF document and therefore do not require translation or replacement.

In some embodiments, the MFEF server 502 includes an MFEF translator 520. In some embodiments, the MFEF translator 520 operates in response to the embedded element language detector 518 detecting the languages of the embedded elements to acquire translations of each of the embedded elements. In some embodiments, the MFEF translator 520 utilizes a variety of third-party computer-based machine translation services for translating one or more of the embedded elements. In some embodiments, the MFEF translator 520 includes one or more modules that utilize known computer-based technology for acquiring machine-generated translations of one or more of the embedded elements. In some embodiments, the MFEF translator 520 utilizes human translators for translating one or more of the embedded elements. In some embodiments, the MFEF translator 520 selects from among two or more translators based at least in part on a level of service associated with the requesting user. For example, in some embodiments, the MFEF translator 520 selects a more accurate and/or more expensive translator for a user associated with a first tier of service, and selects a less accurate and/or less expensive translator for a user associated with a second tier of service.

In some embodiments, the MFEF server 502 includes an MFEF generator 522 that receives the translated embedded elements and generates a new MFEF document that includes the translated embedded elements. In some embodiments, the MFEF generator 522 returns the translated embedded elements to the MFEF client 504.

In some embodiments, the MFEF client 504 includes a display wizard 524 that receives the translated MFEF document and saves the new MFEF document as target document 526 in a temporal directory. The display wizard 524 returns a pointer to the user's web browser that directs the web browser to display the target document 526 with the translated embedded elements. In some embodiments, the display wizard 524 verifies the structure of the new MFEF document matches that of the original MFEF document and that the translated embedded elements replace the corresponding foreign-language embedded elements in the same respective locations as the foreign-language embedded elements. In some embodiments, the display wizard 524 uses prefetching technology for embedded elements that are still being translated when the MFEF generator 522 sends the new MFEF document to the display wizard 524. In some such embodiments, the MFEF generator 522 includes a link for embedded elements that are still being translated, and the display wizard 524 inserts a temporary message to alert the user 506 to the pending status of such translations, and remove the temporary message once the translations are complete and the translated embedded elements have been received and embedded in the new MFEF document.

In some embodiments, the MFEF server 502 includes an MFEF manager 528 that oversees the translation operations of the MFEF server 502. For example, in some embodiments, the MFEF manager 528 provides a unique request ID to the MFEF API 514 each time the MFEF API 514 receives a new translation request. In some embodiments, the MFEF manager 528 stores MFEF service profiles 530 that include data related to one or more levels of service, or service tiers, available to registered users. In some embodiments, the MFEF service profiles 530 include third party translation services that are available for the different service tiers, along with associated information, such as cost and contact information related to each of the third-party translation services.

In some embodiments, the MFEF manager 528 allows users to register and create user accounts. In some embodiments, the MFEF manager 528 generates a graphical user interface (GUI) that allows a user to create and manager their account, including making selections for any options available for user accounts such as preferred languages, types of elements to translate, and/or level of service or service tier. In some such embodiments, the MFEF manager 528 stores user information for registered users as user profiles 532. In some embodiments, the user profiles 532 includes user information, for example the user's name, business name, preferred language, and contact information. In some embodiments, the user profiles 532 includes request IDs for requests that have been made by respective users. In some embodiments, the user profiles 532 includes a service level or service tier associated with each of the registered users. that include data related to one or more levels of service, or service tiers, available to registered users.

In some embodiments, the MFEF manager 528 generates an MFEF data structure 534 for each translation request. In some embodiments, the MFEF data structure 534 includes a unique request ID associated with a user account, allowing the MFEF translation request to be associated with the appropriate user. In some embodiments, the MFEF data structure 534 includes other information related to the translation request such as the name and location of the MFEF document, types of elements in the MFEF document, languages of elements in the MFEF document, and translator used to translate each of the foreign-language elements in the MFEF document. Thus, in some embodiments, the MFEF manager 528 is in communication with the MFEF API 514, embedded element recognizer 516, embedded element language detector 518, MFEF translator 520, and MFEF generator 522 to maintain and update the MFEF data structure 534 as the translation request is processed by the different components of the MFEF server 502.

With reference to FIG. 6, this figure depicts a block diagram of an embodiment of an MFEF data structure 600 in accordance with an illustrative embodiment. In some embodiments, the MFEF data structure 600 is an example of MFEF data structure 534 of FIG. 5.

In some embodiments, the MFEF data structure 600 includes a Request ID 602 (or "ID" 602), a Source Document Name 604 (or "Document" 604), a Source Document Path 606 (or "Path" 606), a Source Document Language 608, a List or Array of Embedded Elements and Formats 610 (or "Element List" 610), a List or Array of Languages of Embedded Elements 612 (or "Language List" 612), a List or Array of Translation Tools or Services 614 (or "Translator List" 614), and a User Preferred Target Language 616 (or "User Language" 616). In some embodiments, the API 514 expects at least the fields 602, 604, and 606 to be filled out as minimum requirement by MFEF REQUESTOR 512. The field 608, 612, 614 and 616 can be filled out during the MFEF translation service by the MFEF server. In some embodiments, the ID 602 is a key value that uniquely identifies a translation record. In some embodiments, the ID 602 identifies related records in one or more other tables of a user database, for example transaction table that lists all translation requests by ID 602 an associated cost, if any. In some embodiments, the ID 602 is provided by the MFEF manager 528 and identifies related records in one or more other tables of an MFEF server database, for example a customer table that lists all translation requests by ID 602 an associated customer number or customer information.

In some embodiments, Document 604 is a file name for the MFEF to be translated. In some embodiments, the MFEF server 502 receives a copy of the MFEF and stores it in a file system somewhere it is accessible to the MFEF server 502, and the Document 604 is a pointer, link, or shortcut to the MFEF. In some embodiments, the MFEF is stored in the database at Document 604. In some embodiments, Path 606 includes a description of the MFEF document location, for example a path to where the MFEF document is stored in a file system. In some embodiments, the translation request does not include a copy of the MFEF document, but instead includes a description of a location of the file, for example a URL. In some embodiments, the Source Document Language 608 is the language that is considered to be the primary language of the Document 604. For example, in the embodiment shown in FIG. 6, the Source Document Language is English (or "EN") based on the main text areas Main001.text of the screen 300 being in English, and despite other elements being in other languages (e.g., Main789.mp4 is in French). In some embodiments, the Source Document Language 608 can include a list of all languages present in the MFEF document.

In some embodiments, the Element List 610 includes a list of embedded elements in the MFEF document at Document 604. In some embodiments, the Element List 610 includes fewer than all of the embedded elements in the MFEF document at Document 604. For example, in some embodiments, the Element List 610 includes only embedded elements that are in a selected region of the MFEF document the User requests to be translated, such selected pages of a presentation file or a selected region of a screen that is rendered from an HTML file. As another example, in some embodiments, the Element List 610 includes only embedded elements that are not in one of the user's preferred languages, so the Element List 610 has already been processed to filter out elements that are not part of the material to be translated. In some embodiments, the Language List 612 includes the same list of elements from Element List 610, but each element in the Language List 612 includes an indication of the element's language. For example, in the embodiment shown in FIG. 6, the Language List 612 is a multidimensional array, where each list item is an array that includes an element followed by its language.

In some embodiments, the Translator List 614 includes a list of translation tools or services that the MFEF server 502 plans to use to translate one or more of the elements in the Element List 612. Thus, in some embodiments, the Translator List 614 is generated by the MFEF server 502 using translator information stored in the MFEF service profile 530. In some alternative embodiments, the MFEF API 514 allows the API request to request one or more specific translation tools or services, or one or more different tiers or levels of service, e.g., ranging from machine translation to human translation, providing audio/video translations in the form of written transcripts or in an audio/video format. For example, in some embodiments, the User 506 requests an upper-tier translation service for a video element (e.g., Main789.mp4), where the upper-tier service includes human translation delivered to the user in an audio format that replaces the original foreign-language audio in the video element. As another example, in some embodiments, the User 506 requests a lower-tier translation service for an audio element (e.g., Main123.mp3), where the lower-tier service includes a machine translation delivered to the user in a written format as a transcript of the translated audio. In such embodiments, the Translator List 614 can include the user's designation of options (e.g., human or machine translation, and/or output in written or audio format). For example, if the user's preferred language is Chinese (or "ZH"), the embedded element language detector 518 will update the Translator List 614 and pass all of the embedded elements to the MFEF translator 520 for translation to Chinese: Translator-1 (Main123.mp3, EN->ZH); Translator-2 (Main456.jpg, JA->ZH); Translator-3 (Main789.mp4, FR->ZH); Translator-4 (Main002.text, ES->ZH).

In some embodiments, the User Language 616 includes target language information, which informs the MFEF server 502 as to which language(s) the elements will be translated. In some embodiments, the User 506 designates a single target language to which all elements will be translated. In some embodiments, the User 506 designates one or more different target languages on an element-by-element basis. In some embodiments, the User Language 616 is automatically designated by the MFEF server 502 based on the user's profile data.

Figure 7:
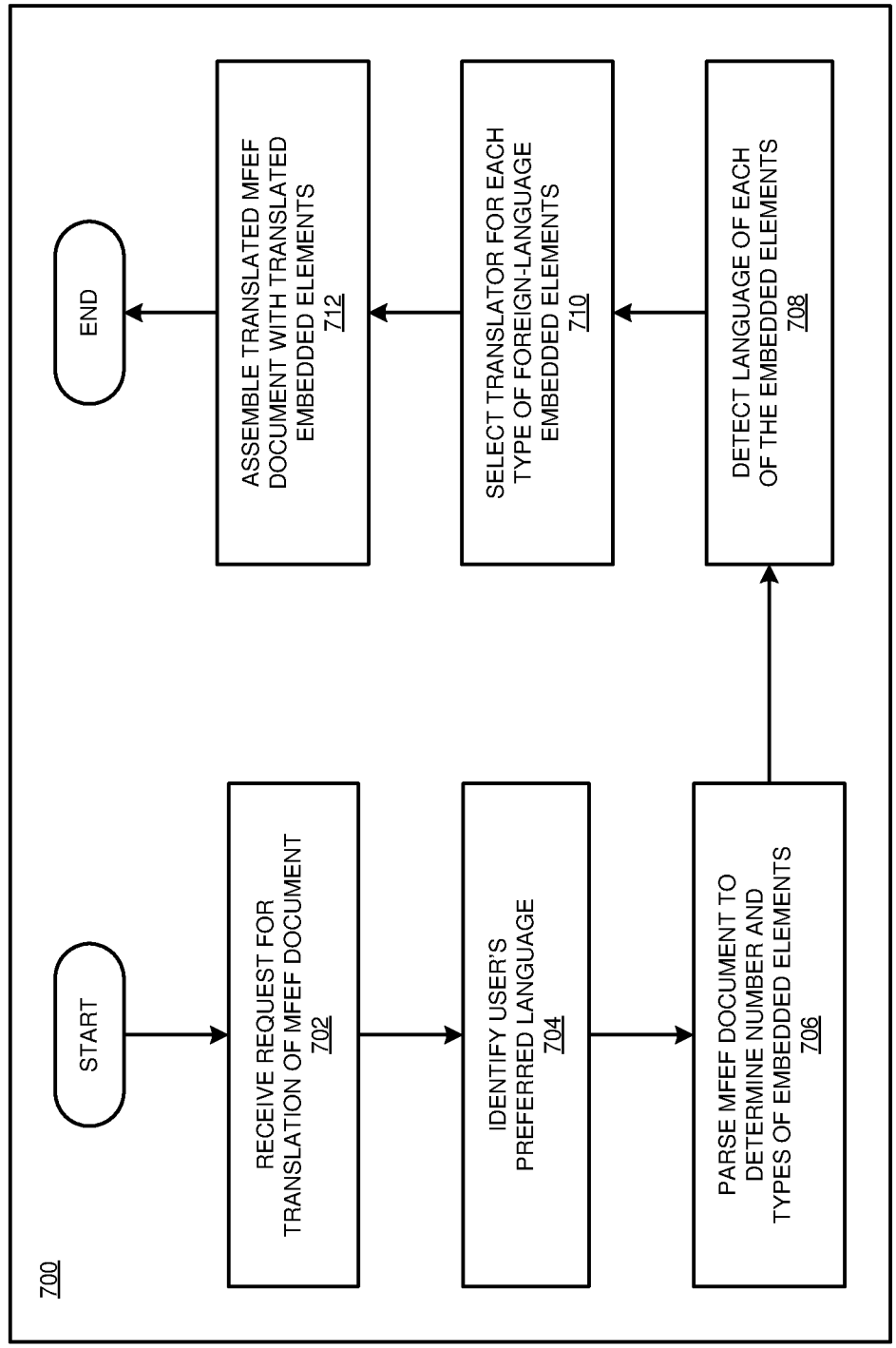
FIG. 7 depicts a flowchart of an example process for translating MFEF documents in accordance with an illustrative embodiment.

With reference to FIG. 7 this figure depicts a flowchart of an example process 700 for translating MFEF documents in accordance with an illustrative embodiment. In a particular embodiment, the MFEF server 502 carries out the process 700.

In an embodiment, at block 702, the MFEF server 502 receives a request for translation of an MFEF document. In some embodiments, the request is structured according to a format defined by an MFEF API. For example, in some embodiments, the API request comprises the MFEF document, the MFEF document name, a URL or file location of the MFEF document.

Next, at block 704, the MFEF server 502 identifies a preferred language of the requesting user. In some embodiments, the MFEF server 502 receives the preferred language as part of the translation request. In some embodiments, the MFEF server 502 receives the preferred language of the user as part of a registration process in which the user created an account with the MFEF server. In some embodiments, the MFEF server receives the preferred language based on monitoring the user history or user behavior, such as identifying languages of websites that the user frequently visits.

Next, at block 706, the MFEF server 502 parses the information in the translation request, including parsing the MFEF document, and recognizes the number and types of embedded elements in the MFEF document. Next, at block 708, the MFEF server 502 utilizes known technology to detect the language of each of the detected embedded elements. In some embodiments, the MFEF server 502 evaluates audio and video elements to determine whether there are captions or subtitles in addition to the audio that will also be translated. In some embodiments, MFEF server 520 compares the detected languages of the embedded elements to the preferred language of the user to determine which embedded elements need to be translated to the user's preferred language.

Next, at block 710, the MFEF server 502 acquires translations of each of the embedded elements. In some embodiments, the MFEF server 502 utilizes a variety of third-party translation services for translating one or more of the embedded elements. In some embodiments, the MFEF server 502 includes one or more modules that utilize known technology for translating one or more of the embedded elements. In some embodiments, the MFEF server 502 utilizes human translators for translating one or more of the embedded elements. In some embodiments, the MFEF server 502 selects from among two or more translators based at least in part on a level of service associated with the requesting user. For example, in some embodiments, the MFEF server 502 selects a more accurate and/or more expensive translator for a user associated with a first tier of service, and selects a less accurate and/or less expensive translator for a user associated with a second tier of service.

Next, at block 712, the MFEF server 502 receives the translated embedded elements and generates a new MFEF document that includes the translated embedded elements. In some embodiments, the MFEF server 502 returns a new MFEF document that includes translated elements and at least one link to an element that is still being translated, and upon completion, the link will be to the translated element.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "illustrative" is used herein to mean "serving as an example, instance or illustration." Any embodiment or design described herein as "illustrative" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include an indirect "connection" and a direct "connection."

References in the specification to "one embodiment," "an embodiment," "an example embodiment," etc., indicate that the embodiment described can include a particular feature, structure, or characteristic, but every embodiment may or may not include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

Thus, a computer implemented method, system or apparatus, and computer program product are provided in the illustrative embodiments for managing participation in online communities and other related features, functions, or operations. Where an embodiment or a portion thereof is described with respect to a type of device, the computer implemented method, system or apparatus, the computer program product, or a portion thereof, are adapted or configured for use with a suitable and comparable manifestation of that type of device.

Where an embodiment is described as implemented in an application, the delivery of the application in a Software as a Service (SaaS) model is contemplated within the scope of the illustrative embodiments. In a SaaS model, the capability of the application implementing an embodiment is provided to a user by executing the application in a cloud infrastructure. The user can access the application using a variety of client devices through a thin client interface such as a web browser (e.g., web-based e-mail), or other light-weight client-applications. The user does not manage or control the underlying cloud infrastructure including the network, servers, operating systems, or the storage of the cloud infrastructure. In some cases, the user may not even manage or control the capabilities of the SaaS application. In some other cases, the SaaS implementation of the application may permit a possible exception of limited user-specific application configuration settings.

The present invention may be a system, a method, and/or a computer program product at any possible technical detail level of integration. The computer program product may include a computer readable storage medium (or media)

having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:
1. A computer implemented method comprising:
receiving, by a server that provides a plurality of service tiers, a request from a user for translation of a multi-format embedded file (MFEF) document, wherein the MFEF document includes a plurality of embedded elements, and wherein the plurality of service tiers include respective groups of translation services; and responsive to the request for the MFEF document, the server automatically:
  identifying, by parsing the MFEF document, element types of the embedded elements, wherein the embedded elements include a first element type and a second element type;
  identifying foreign-language embedded elements from among the plurality of embedded elements, the foreign-language embedded elements being embedded elements that are in a language other than a preferred language of the user;
  generating a data structure that includes a request ID uniquely associated with the request, and includes the identified foreign-language embedded elements;
  associating the request ID with a user profile stored on the server and associated with the user;
  identifying, from the user profile, a designated service tier previously selected by the user from among the plurality of service tiers;
  selecting a first translator for translating the first element type of foreign-language embedded elements and a second translator selected for translating the second element type of foreign-language embedded elements based at least in part on the designated service tier identified from the user profile; and
  translating the foreign-language embedded elements using the first translator selected for translating the first element type of foreign-language embedded elements and the second translator selected for translating the second element type of foreign-language embedded elements.

2. A method according to claim 1, wherein the request comprises location information regarding a location of the MFEF document.

3. A method according to claim 2, wherein the location information comprises a uniform resource locator (URL).

4. A method according to claim 1, wherein the request comprises the MFEF document.

5. A method according to claim 1, wherein the element types include a text format and a non-text format.

6. A method according to claim 5, wherein the non-text format includes at least one member selected from a set of a video format, an audio format, and an image format.

7. A method according to claim 1, wherein the translating of the foreign-language embedded elements includes creating preferred-language replacement elements for respective foreign-language embedded elements.

8. A method according to claim 7, further comprising generating a preferred-language replacement MFEF document that includes the preferred-language replacement elements.

9. A method according to claim 1, further comprising determining the preferred language of the user based at least in part on past behavior of the user.

10. A method according to claim 1, wherein the request includes headers, and
  wherein the method further comprises determining the preferred language of the user based at least in part on information in the headers.

11. A method according to claim 1, wherein the receiving, by the server, of the request for the MFEF includes receiving the request using an application program interface (API).

12. A computer usable program product comprising a computer-readable storage medium, and program instructions stored on the storage medium, the stored program instructions comprising:
  program instructions to receive, by a server that provides a plurality of service tiers, a request from a user for translation of a multi-format embedded file (MFEF) document, wherein the MFEF document includes a plurality of embedded elements, and wherein the plurality of service tiers include respective groups of translation services; and
  program instructions to automatically, by the server in response to the request for the MFEF document:
    identify, by parsing the MFEF document, element types of the embedded elements, wherein the embedded elements include a first element type and a second element type;
    identify foreign-language embedded elements from among the plurality of embedded elements, the foreign-language embedded elements being embedded elements that are in a language other than a preferred language of the user;
    generate a data structure that includes a request ID uniquely associated with the request, and includes the identified foreign-language embedded elements;
    associate the request ID with a user profile stored on the server and associated with the user;
    identify, from the user profile, a designated service tier previously selected by the user from among the plurality of service tiers;
    select a first translator for translating the first element type of foreign-language embedded elements and a second translator selected for translating the second element type of foreign-language embedded elements based at least in part on the designated service tier identified from the user profile; and
    translate the foreign-language embedded elements using the first translator selected for translating the first element type of foreign-language embedded elements and the second translator selected for translating the second element type of foreign-language embedded elements.

13. A computer usable program product of claim 12, wherein the request comprises location information regarding a location of the MFEF document.

14. A computer usable program product of claim 12, wherein the element types include a text format and at least one member selected from a set of a video format, an audio format, and an image format.

15. A computer usable program product of claim 12, wherein the translating of the foreign-language embedded elements includes creating preferred-language replacement elements for respective foreign-language embedded elements; and
  wherein the stored program instructions further comprise program instructions to generate a preferred-language replacement MFEF document that includes the preferred-language replacement elements.

16. A computer usable program product of claim 12, further comprising determining the preferred language of the user based at least in part on past behavior of the user.

17. A computer system comprising a processor, a computer-readable memory, and a computer-readable storage medium, and program instructions stored on the storage medium for execution by the processor via the memory, the stored program instructions comprising:
  program instructions to receive, by a service that provides a plurality of service tiers, a request from a user for translation of a multi-format embedded file (MFEF) document, wherein the MFEF document includes a plurality of embedded elements, and wherein the plurality of service tiers include respective groups of translation services; and program instructions to automatically, by one or more processors in response to the request for the MFEF document:
  identify, by parsing the MFEF document, element types of the embedded elements, wherein the embedded elements include a first element type and a second element type;
  identify foreign-language embedded elements from among the plurality of embedded elements, the foreign-language embedded elements being embedded elements that are in a language other than a preferred language of the user;
  generate a data structure that includes a request ID uniquely associated with the request, and includes the identified foreign-language embedded elements;
  associate the request ID with a user profile stored on a server and associated with the user;
  identify, from the user profile, a designated service tier previously selected by the user from among the plurality of service tiers;
  select a first translator for translating the first element type of foreign-language embedded elements and a second translator selected for translating the second element type of foreign-language embedded elements based at least in part on the designated service tier identified from the user profile; and
  translate the foreign-language embedded elements using the first translator selected for translating the first element type of foreign-language embedded elements and the second translator selected for translating the second element type of foreign-language embedded elements.

18. The computer system of claim 17, wherein the request comprises location information regarding a location of the MFEF document.

19. The computer system of claim 17, wherein the element types include a text format and at least one member selected from a set of a video format, an audio format, and an image format.

20. The computer system of claim 17, wherein the translating of the foreign-language embedded elements includes creating preferred-language replacement elements for respective foreign-language embedded elements; and
  wherein the stored program instructions further comprise program instructions to generate a preferred-language replacement MFEF document that includes the preferred-language replacement elements.

* * * * *